Sept. 10, 1929.  G. BUDACH  1,727,501

MILKING APPARATUS

Filed April 20, 1927

Inventor:
Gustav Budach

Patented Sept. 10, 1929.

1,727,501

UNITED STATES PATENT OFFICE.

GUSTAV BUDACH, OF FLENSBURG, GERMANY.

MILKING APPARATUS.

Application filed April 20, 1927, Serial No. 185,277, and in Germany April 28, 1926.

This invention relates to an improved milking apparatus of that known kind having a double-walled milking cup at the lower end of which a pulsator is so arranged that the milk flows through a lateral suction pipe directly from the teat chamber of the apparatus into the milking pail that is under permanent reduced pressure. The essence of the invention consists in the provision of a permanent narrow communication between the outer and inner chambers of the milking cup and in the fact that the air admission opening of the pulsator is controlled by one single spherical valve only, whereby the hitherto frequently occurring disturbances in the working of such pulsators are effectively avoided.

Figure 1:
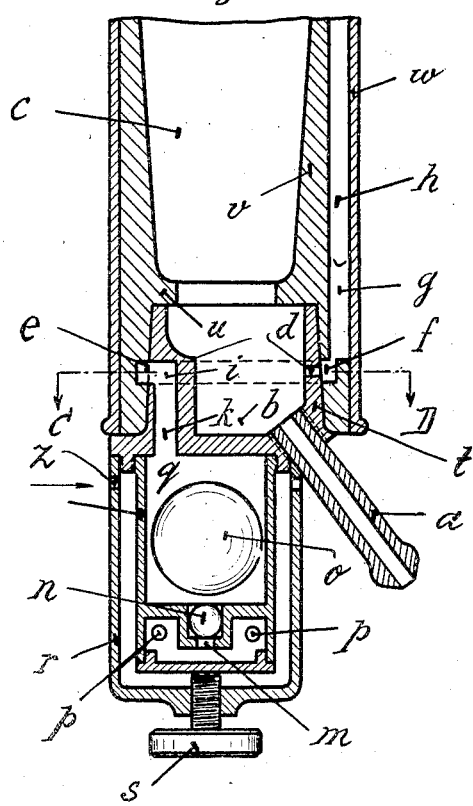
Figure 2:
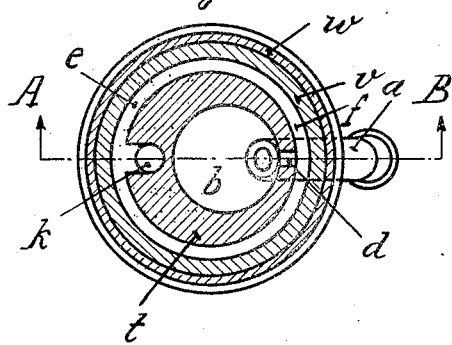

The accompanying drawing illustrates the improved milking apparatus: Fig. 1 is a vertical central section through the lower part of the same on the line A—B of Fig. 2, which is a cross-section on the line C—D of Fig. 1.

The apparatus comprises an outer cylindrical metal shell $w$ with the elastic teat cup $v$ inserted therein, said cup enclosing the teat chamber $c$ and forming with the wall of said metal shell the pressure varying chamber $h$, said chambers $c$ and $h$ being in communication with one another through vertical channels $g$, an annular channel $e$, $f$, and a narrow boring $d$. In the lower end of the teat cup $v$ a conical bush $t$ is inserted, which carries the pulsator and bears at its upper end against a flange $u$ provided in the teat cup $v$, said bush having a cylindrical cavity $b$ from the bottom of which the inclined lateral suction pipe $a$ leads to the outside, the same being connected with the milking pail by means of a rubber pipe (not shown).

The pulsator comprises an inner casing $l$ forming a valve-chamber $q$ with a valve-seat in its false bottom and a spherical valve $n$ therein facing a lower port $m$, while for loading said valve and safety guiding it a bronze ball $o$ is located with little play within said valve-chamber, the latter being in communication with the annular channel $e$, $f$ through a vertical channel $k$ and a port $i$ provided in the bush $t$. The casing $l$ is provided, at its lower part projecting beyond its false bottom, with openings $p$ and at its bottom, that is loosely inserted therein, acted-upon by a pressure-screw $s$ which tightens said bottom and screws into the outer casing $r$ surrounding said inner casing and having air admission holes $z$ in its walls.

The operation of the improved pulsator is as follows:—The suction pipe $a$ is, as mentioned, connected with the milking pail, in which a vacuum conduit produces a permanent reduced pressure, and the teat cup $v$ is applied to the teat. With the valve $n$ being in closed position, the vacuum produced by the milking action through the suction pipe $a$ extends further from the chamber $b$ to the teat chamber $c$ and through the narrow boring $d$ and the annular channel $e$, $f$ and the vertical channels $g$ to the pressure varying chamber $h$, as well as through the channels $i$ and $k$ to the valve chamber $q$, whereby equal pressure exists in the teat chamber $c$, the pressure varying chamber $h$, and the valve-chamber $q$, the elastic teat cup $v$ assuming thus its natural position. The inferior pressure existing in said chambers then lifts the valve $n$ and outer air flows thereby through $z$, $m$, $q$, $k$, $e$, $f$, $g$ into the pressure varying chamber $h$ while a small quantity thereof escapes through the narrow port $d$ into the chamber $b$ whence it is at once sucked-off through the suction pipe $a$ without materially influencing the inferior pressure existing in the teat chamber $c$. At the same time, the air in the pressure varying chamber $h$ presses the elastic teat cup $v$ upon the teat, said pressure acting, exactly like with hand milking, from above to down below as the wall of the teat cup is thinner at its upper part than at its lower part.

The milk flows thus, exactly as with hand milking, by a compression of the teat from the teat chamber $c$ through the chamber $b$ and the suction pipe $a$ into the milking pail, without passing into the valve-chamber of the pulsator. By the admission of outer air, the pressure difference in the valve-chamber and in the pressure varying chamber with reference to the outer air is neutralized and by the weight of the bronze ball $o$ the valve $n$ is closed, so that the same proceeding begins afresh whereby the required uniformly pulsating action for the treatment of the teat is attained.

What I claim, is:—

The combination, with a double-walled milking cup comprising an inner suction teat chamber and an outer pressure varying chamber and a pulsator with a valve-chamber in communication with the outer air and with said outer chamber respectively, of a permanent narrow communication between said inner and outer chambers, and one single spherical valve in said valve-chamber controlling the air admission to said outer chamber and to said inner chamber.

In testimony whereof I have hereunto set my hand.

GUSTAV BUDACH.